(12) United States Patent
Ebina et al.

(10) Patent No.: US 8,970,730 B2
(45) Date of Patent: Mar. 3, 2015

(54) IMAGING APPARATUS FOR CONTROLLING AND DISPLAYING FLICKER AMOUNTS

(71) Applicant: Hitachi, Ltd., Tokyo (JP)

(72) Inventors: Yuki Ebina, Hitachinaka (JP); Takeshi Tahara, Tokyo (JP); Haruhiko Miyao, Mito (JP); Makoto Kikuchi, Hitachiota (JP); Akinori Shiozawa, Yokohama (JP)

(73) Assignee: Hitachi Industry & Control Solutions, Ltd., Ibaraki (JP)

( * ) Notice: Subject to any disclaimer, the term of this patent is extended or adjusted under 35 U.S.C. 154(b) by 74 days.

(21) Appl. No.: 13/914,736

(22) Filed: Jun. 11, 2013

(65) Prior Publication Data

US 2013/0342726 A1 Dec. 26, 2013

(30) Foreign Application Priority Data

Jun. 20, 2012 (JP) .................................. 2012-139075

(51) Int. Cl.
| | | |
|---|---|---|
| *H04N 9/73* | (2006.01) | |
| *H04N 5/235* | (2006.01) | |
| *H04N 5/232* | (2006.01) | |
| *H04N 5/238* | (2006.01) | |
| *H04N 5/243* | (2006.01) | |

(52) U.S. Cl.
CPC ......... *H04N 5/2357* (2013.01); *H04N 5/23245* (2013.01); *H04N 5/23293* (2013.01); *H04N 5/2352* (2013.01); *H04N 5/238* (2013.01); *H04N 5/243* (2013.01)
USPC .................. 348/226.1; 348/227.1; 348/228.1; 348/362

(58) Field of Classification Search
None
See application file for complete search history.

(56) References Cited

U.S. PATENT DOCUMENTS

| | | | | |
|---|---|---|---|---|
| 6,501,518 | B2 * | 12/2002 | Smith et al. ................ | 348/425.3 |
| 8,040,393 | B2 * | 10/2011 | Katoh et al. ................ | 348/228.1 |
| 2004/0080630 | A1 * | 4/2004 | Kim ............................ | 348/226.1 |
| 2007/0182831 | A1 * | 8/2007 | Katoh et al. ................ | 348/226.1 |
| 2008/0309791 | A1 * | 12/2008 | Nishiwaki et al. ......... | 348/226.1 |
| 2011/0205394 | A1 * | 8/2011 | Fuchigami ................. | 348/226.1 |

FOREIGN PATENT DOCUMENTS

| | | |
|---|---|---|
| JP | 2009-077057 A | 4/2009 |
| JP | 2010-74484 A | 4/2010 |
| JP | 2012-054844 A | 3/2012 |

* cited by examiner

*Primary Examiner* — Lin Ye
*Assistant Examiner* — John H Morehead, III
(74) *Attorney, Agent, or Firm* — Mattingly & Malur, P.C.

(57) ABSTRACT

An imaging apparatus is provided in which a flicker is prevented. The imaging apparatus includes an imaging part that includes an optical system to form an image of a subject and an imaging element to generate an image signal by photoelectrically converting an optical image of the subject formed by the optical system, an image processing part to perform an image processing on the image signal, a display part/operation part having at least display and setting functions, a luminance change detection part to detect change of luminance of the subject, a signal processing part to calculate flicker amounts at respective frequencies based on signal intensities with respect to luminance change information acquired by the luminance change detection part, and a control unit to cause the display part/operation part to display the flicker amounts at the respective frequencies calculated by the signal processing part.

13 Claims, 6 Drawing Sheets

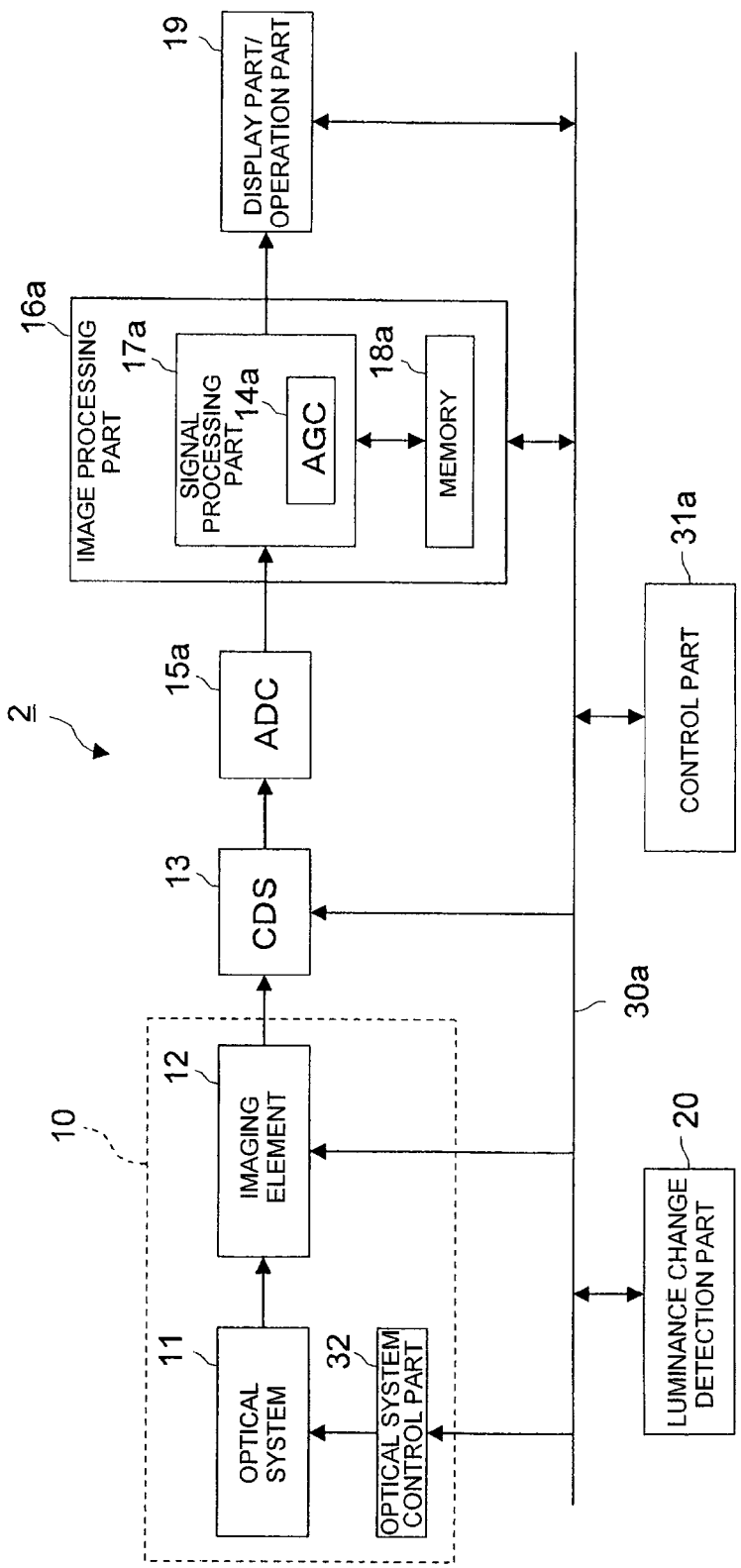

IMAGING APPARATUS FOR CONTROLLING AND DISPLAYING FLICKER AMOUNTS

FIELD

The present invention relates to an imaging apparatus in which a flicker is prevented.

BACKGROUND

In an imaging apparatus for taking an image of a subject, various methods for suppressing an influence of flicker are studied. The flicker here means a flickering phenomenon in alternating current lighting illumination or the like. For example, in a general fluorescent lamp, blinking is repeated at a frequency twice a power supply frequency. In a case of an alternating current power supply of 50 Hz, a blinking frequency of a light source is 100 Hz and a blinking period is 1/100 second. In a case of an alternating current power supply of 60 Hz, the blinking frequency of the light source is 120 Hz, and the blinking period is 1/120 second. The blinking frequency is generally so high that it can not be grasped by the naked eye. However, when an imaging apparatus is used and takes a picture of a subject illuminated by a light source at a shutter speed higher than the blinking speed, the flicker is recognized.

On the other hand, a method is known which prevents flicker at the time of imaging by causing the shutter speed of the imaging apparatus to become a multiple of the blinking period of the light source, and is widely applied to products. That is, in a case of a general fluorescent lamp, when the power supply frequency is 50 Hz, the blinking period of the light source is 1/100 second. Thus, the shutter speed is made 1/100 second or 1/50 second. Besides, when the power supply frequency is 60 Hz, the blinking period of the light source is 1/120 second. Thus, the shutter speed is made 1/120 second or 1/60 second.

Besides, as a related art method, for example, patent literature 1 discloses a method in which the luminance of a subject is measured at the time of slit exposure (including the time of continuous shooting mode), a flicker period and a flicker phase are calculated, and an exposure start timing and a timing when the luminance of the subject becomes maximum are synchronized based on these, so that the influence of flicker becomes as small as possible.

Besides, patent literature 2 discloses a method in which a timing when the brightness of a subject becomes maximum and a flicker period are detected, reading of an image signal from an imaging element is controlled so that the timing when the brightness becomes maximum coincides with an almost center of an exposure period of one frame of the imaging element, and the frame period becomes equal to the flicker period, and shading is suppressed.
Patent literature 1: JP-A-2010-74484
Patent literature 2: JP-A-2009-77057

As described above, when the blinking period of the light source, that is, the power supply frequency is known, and it is known that the light source frequency is a multiple of the power supply frequency as in the general fluorescent lamp, the flicker can be prevented by causing the shutter speed to become a multiple of the light source blinking period. Besides, when the light source frequency (power supply frequency) is not known, as in patent literature 1 or patent literature 2, measures can be taken by detecting the flicker period and the flicker phase.

However, if a subject is illuminated by plural light sources having different light source frequencies, the flicker can not be prevented by the foregoing various techniques. For example, there is a case where a subject is illuminated by a fluorescent lamp having a light source frequency of 100 Hz and a fluorescent lamp having a light source frequency of 120 Hz. In this case, when the shutter speed of the imaging apparatus is made 1/100 second, a flicker of 120 Hz is recognized. When the shutter speed is made 1/120 second, a flicker of 100 Hz is recognized.

In this case, the flicker can be prevented by prolonging the shutter speed so that the shutter speed becomes a multiple of the blinking period common to the plural light sources, here, 1/20 second. However, when the shutter speed is made long, there occur such defects that an afterimage is generated in the moving subject, an image becomes bright by the increase of the exposure time, and an image desired by the user can not be obtained.

SUMMARY OF INVENTION

The invention is made in view of the above circumstances, and has an object to provide an imaging apparatus in which a flicker is prevented, user's intention is reflected on apparatus setting for preventing the flicker and an image desired by the user can be taken.

In order to solve the problem, according to the invention, an imaging apparatus includes an imaging part that includes an optical system to form an image of a subject and an imaging element to generate an image signal by photoelectrically converting an optical image of the subject formed by the optical system, an image processing part to perform an image processing on the image signal, a user interface unit having at least display and setting functions, a luminance change detection unit configured to detect change of luminance of the subject, a signal processing unit configured to calculate flicker amounts at respective frequencies based on signal intensities with respect to luminance change information acquired by the luminance change detection unit, and a control unit configured to cause the user interface unit to display the flicker amounts at the respective frequencies calculated by the signal processing unit.

According to the invention, the imaging apparatus can be realized in which the flicker is prevented, the user's intention is reflected on apparatus setting for preventing the flicker and an image desired by the user can be taken.

BRIEF DESCRIPTION OF DRAWINGS

FIG. 6 is a structural view of an imaging apparatus of a third embodiment of the invention.

DESCRIPTION OF EMBODIMENTS

Figure 1:
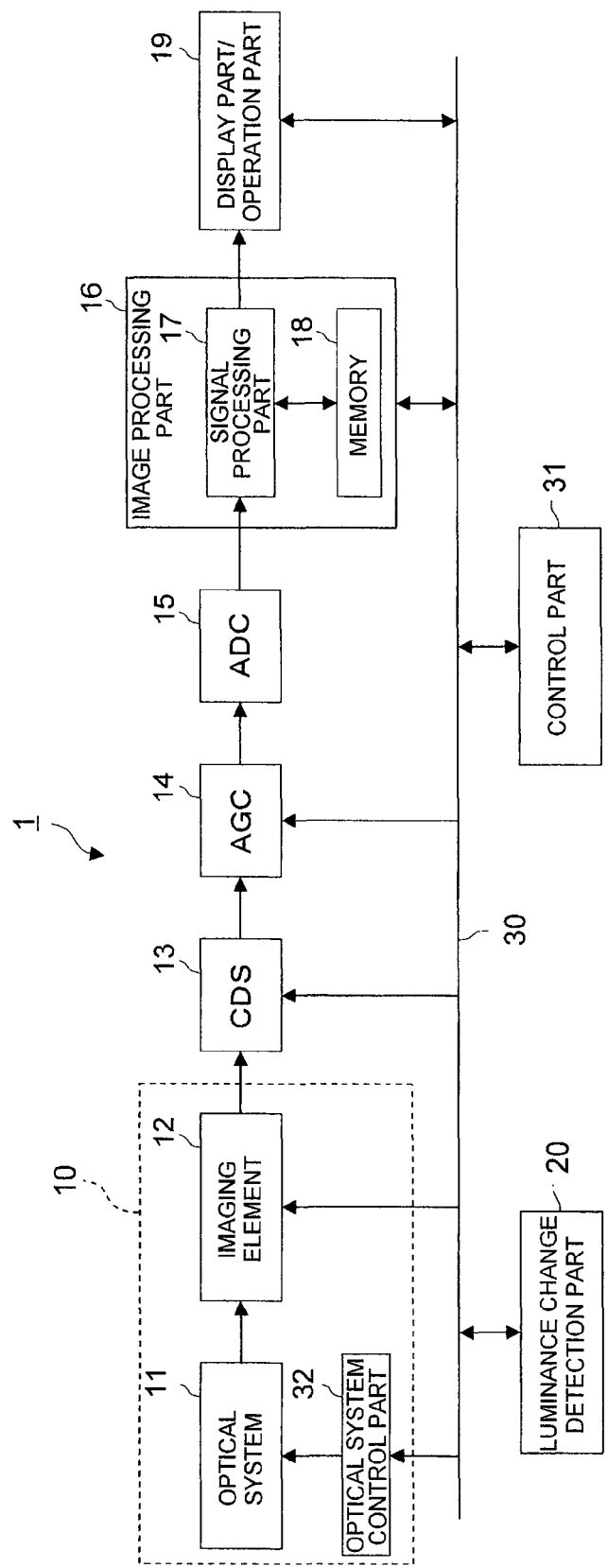
FIG. 1 is a structural view of an imaging apparatus of a first embodiment of the invention.

Hereinafter, embodiments of an imaging apparatus of the invention will be described in detail with reference to the drawings in order of a first embodiment, a second embodiment and a third embodiment. Incidentally, portions common to the respective drawings are denoted by the same reference numerals and a duplicate description thereof is omitted.

First Embodiment

FIG. 1 is a structural view of an imaging apparatus of a first embodiment of the invention. In the drawing, the imaging apparatus 1 of this embodiment includes an imaging part 10 that includes an optical system 11, an imaging element 12 and an optical control part 32, a CDS 13, an analog AGC 14, an ADC 15, an image processing part 16, a display part/operation part (user interface unit) 19, a luminance change detection part 20 and a control part 31.

The optical system 11 includes a lens system that includes an imaging lens and the like and forms a subject image, a mechanical diaphragm mechanism (mechanical iris) and a mechanical shutter mechanism (mechanical shutter). The optical control part 32 controls the optical system 11 according to a control instruction of the control part 31. The optical control part 32 includes a lens control part to control the lens system, an iris control part to control the mechanical iris, and a shutter control part to control the mechanical shutter. Incidentally, the optical system 11 is incorporated in the imaging apparatus 1 main body or is attachable, detachable and exchangeable.

The imaging element 12 photoelectrically converts the optical image of the subject formed by the optical system 11 and generates an image signal. As the imaging element 12, for example, a solid-state imaging element such as a CCD (Charge Coupled Device) imaging element or a CMOS (Complementary Metal Oxide Semiconductor) imaging element is used. Incidentally, although not shown, a driving circuit is provided which generates a drive pulse based on the control instruction from the control part 31 and operates the imaging element 12. That is, the imaging part 10 includes the optical system 11, the imaging element 12, the optical control part 32 and the driving circuit.

Here, the function of an electronic shutter by the imaging element 12 will be briefly described. The electronic shutter is realized by storing an electric charge for a specified period in which the signal electric charge (photo-electric charge) is read by a sensor part of the imaging element 12, and the signal charge prior to that is discharged to another place (for example, a board). For example, a shutter pulse is applied to the board in order to discharge at a certain timing (exposure timing) the signal charge stored in the sensor part prior to the timing, for example, to the board, and the signal charge is read from the sensor part to a vertical transfer register at a timing synchronizing with a vertical synchronous signal. The period from the exposure timing to the reading timing is an exposure time, and becomes a shutter speed. That is, in this case, a shutter pulse is applied (exposure timing) according to the user's half-way press or full press of a release button, and the period from the exposure timing to the reading timing becomes the shutter speed.

Incidentally, the way of defining the shutter speed (exposure time) varies according to the structure of the imaging part 10, and there are roughly three ways of defining the exposure time as described below. The first is that similarly to a silver salt camera, a time in which incident light impinges on the imaging element by opening and closing of the mechanical shutter is made the exposure time. The second is that a time from a time point when a charge is reset to a read time point is made the exposure time (the foregoing definition is included in this). The third is that the start of exposure is made a charge reset time point, and the end of exposure is made a close time point of the mechanical shutter. The application of the invention is not limited to the structure of the imaging part 10, and the shutter speed (exposure time) is not limited to the foregoing definition, either. The shutter speed (exposure time) may be defined according to the structure of the imaging part 10.

The CDS 13 is a so-called correlated double sampling part, and converts an intermittent imaging signal from the imaging element 12 into a continuous imaging signal and removes a noise (reset noise, etc.).

The analog AGC 14 is an auto gain control unit, and adjusts a signal level of an analog imaging signal from the CDS 13 to a specified level based on an instruction of the control part 31.

The ADC 15 is an analog-digital converter circuit, converts the analog imaging signal, the gain of which is controlled by the analog AGC 14, into a digital imaging signal, and supplies the signal to the image processing part 16. Incidentally, the CDS 13, the analog AGC 14 and the ADC 15 are collectively referred to as an AFE (Analog Front End).

The luminance change detection part 20 is realized by, for example, an illuminance sensor, and detects the change of luminance of a subject. The subject luminance change information detected by the luminance change detection part 20 is sent to the signal processing part 17 of the image processing part 16.

The image processing part 16 includes a signal processing part (signal processing unit) 17 and a memory 18, and performs various signal processes on the image signal which is subjected to the analog signal processing through the AFE and is converted into the digital signal. The memory 18 stores image data after various signal processes are performed, and stores programs to be executed on a processor mentioned later, parameters used in various signal processes, and the like.

The signal processing part 17 is realized by, for example, a processor such as a DSP (Digital Signal Processor), and performs various correcting processes such as contour correction and gamma correction, a noise removing process and the like (these are collectively referred to as various signal processes). Further, in this embodiment, the signal processing part 17 performs a process of calculating flicker amounts based on signal intensities at respective frequencies with respect to the subject luminance change information acquired by the luminance change detection part 20.

The flicker amount calculation process is performed in such a way that the subject luminance change information is decomposed into frequency components by a frequency component decomposition method such as, for example, the Fourier transform, and the signal intensities of the respective frequency components are obtained. Incidentally, the flicker amount calculation process is performed also on an image signal obtained when a picture is taken at the shutter speed changed by user setting or automatic setting described later, and the flicker amounts at the respective frequencies based on the signal intensities are calculated with respect to the image signal.

The display part/operation part 19 includes a display part that digitizes and displays the flicker amounts calculated by the signal processing part 17 and performs display for arbitrarily setting the shutter speed, and an operation part to receive a user's operation. Specifically, the display part/operation part 19 includes a touch panel which can input an instruction by a pointing device or finger contact, an operation button and the like.

Figure 3A:
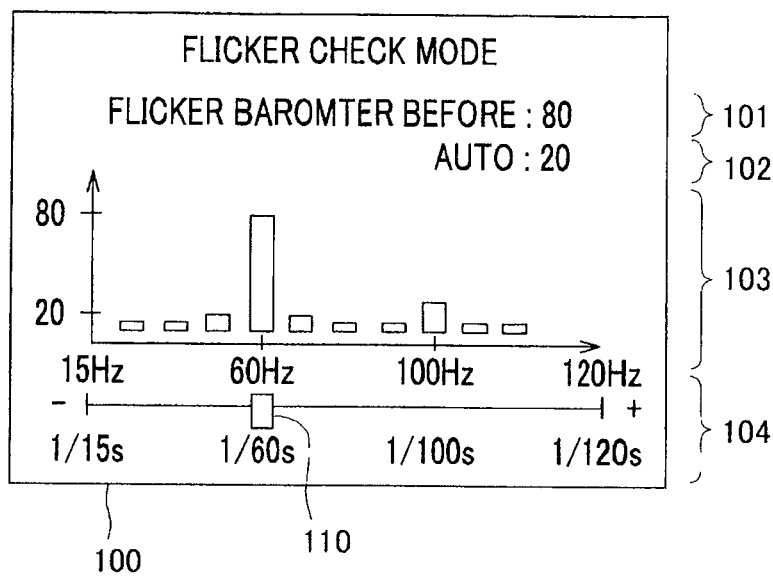
FIG. 3A is an explanatory view for exemplifying a display screen at the time of flicker adjustment and at the time of automatic setting.
Figure 3B:
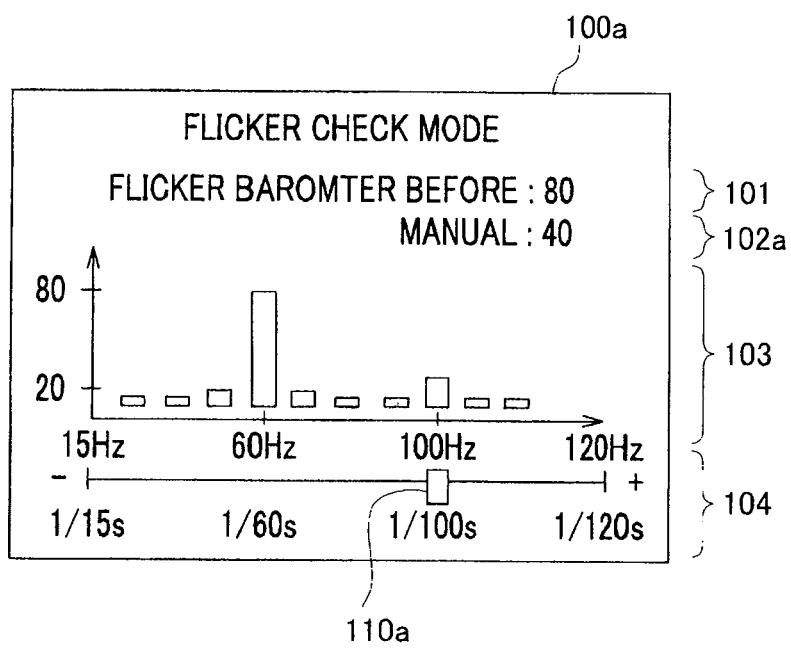
FIG. 3B is an explanatory view for exemplifying a display screen at the time of flicker adjustment and at the time of user's arbitrary setting.

FIGS. 3A and 3B exemplify display screens 100 and 100a in the display part/operation part 19. The display screen 100 in flicker adjustment includes a display area 101 indicating a flicker amount before flicker adjustment, a display area 102 indicating a flicker amount at the time of shutter speed auto-selection, a display area 103 indicating flicker amounts at respective frequencies, and a shutter speed display area 104. The display screen 100a includes a display area 102a indicating a flicker amount at the time of shutter speed arbitrary selection in addition to display areas 101, 103 and 104 the same as in the display screen 100.

The control part 31 includes a processor such as an MPU (Micro-Processing Unit), and memories such as a ROM (Read Only Memory) storing programs and various data and a RAM (Random Access Memory), and collectively controls the respective components included in the imaging apparatus 1. In FIG. 1, connection between the control part 31 and the other components is performed through a system bus 30 including a data signal and a control signal.

The control part 31 causes the display part/operation part 19 to display the flicker amounts based on the signal intensities at the respective frequencies with respect to the subject luminance change information measured by the luminance change detection part 20. In a case of arbitrary user setting, the control part changes the shutter speed of the imaging part 10 based on the user setting. Besides, in a case of automatic setting, based on the flicker amounts at the respective frequencies, the control part changes the shutter speed of the imaging part 10 to a shutter speed corresponding to a frequency at which the flicker amount becomes maximum. A more specific description will be made later.

Incidentally, the exposure control in this embodiment is basically similar to that of the related art, and is performed by using three gain control units of the mechanical iris, the electronic shutter and the analog AGC 14. For example, when the illuminance of the subject is dark, the mechanical iris is opened, and when the exposure is insufficient even if the electronic shutter speed is lengthened, the gain control of the analog AGC 14 is used.

Besides, the mechanical iris is not provided, and the exposure control may be performed only by the electronic shutter. The exposure control as stated above is called electronic iris, and the exposure control is performed by both the electronic shutter and the gain control using the analog AGC 14.

Figure 2:
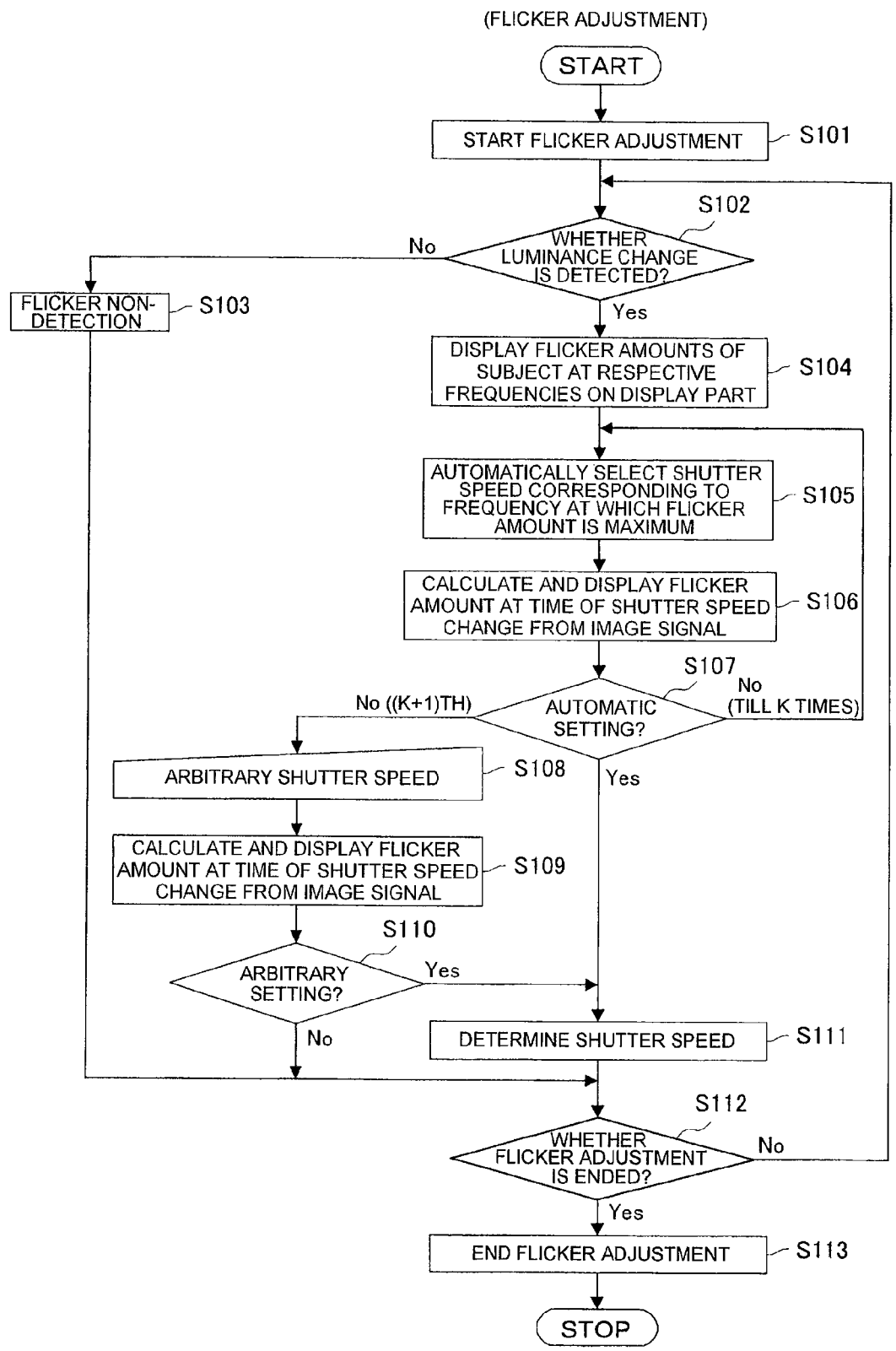
FIG. 2 is a flowchart for explaining a procedure of flicker adjustment.
Figure 4:
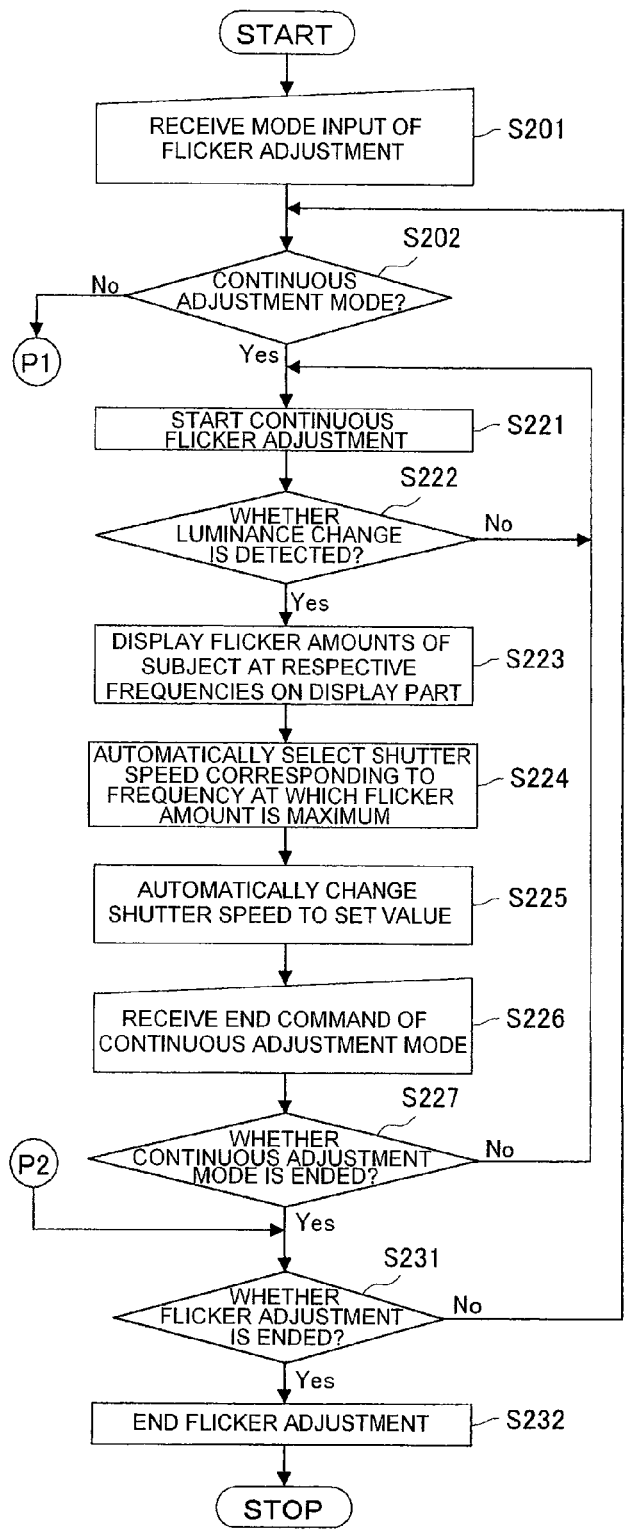
FIG. 4 is a flowchart for explaining a procedure in each mode of flicker adjustment (No. 1: continuous adjustment mode).
Figure 5:
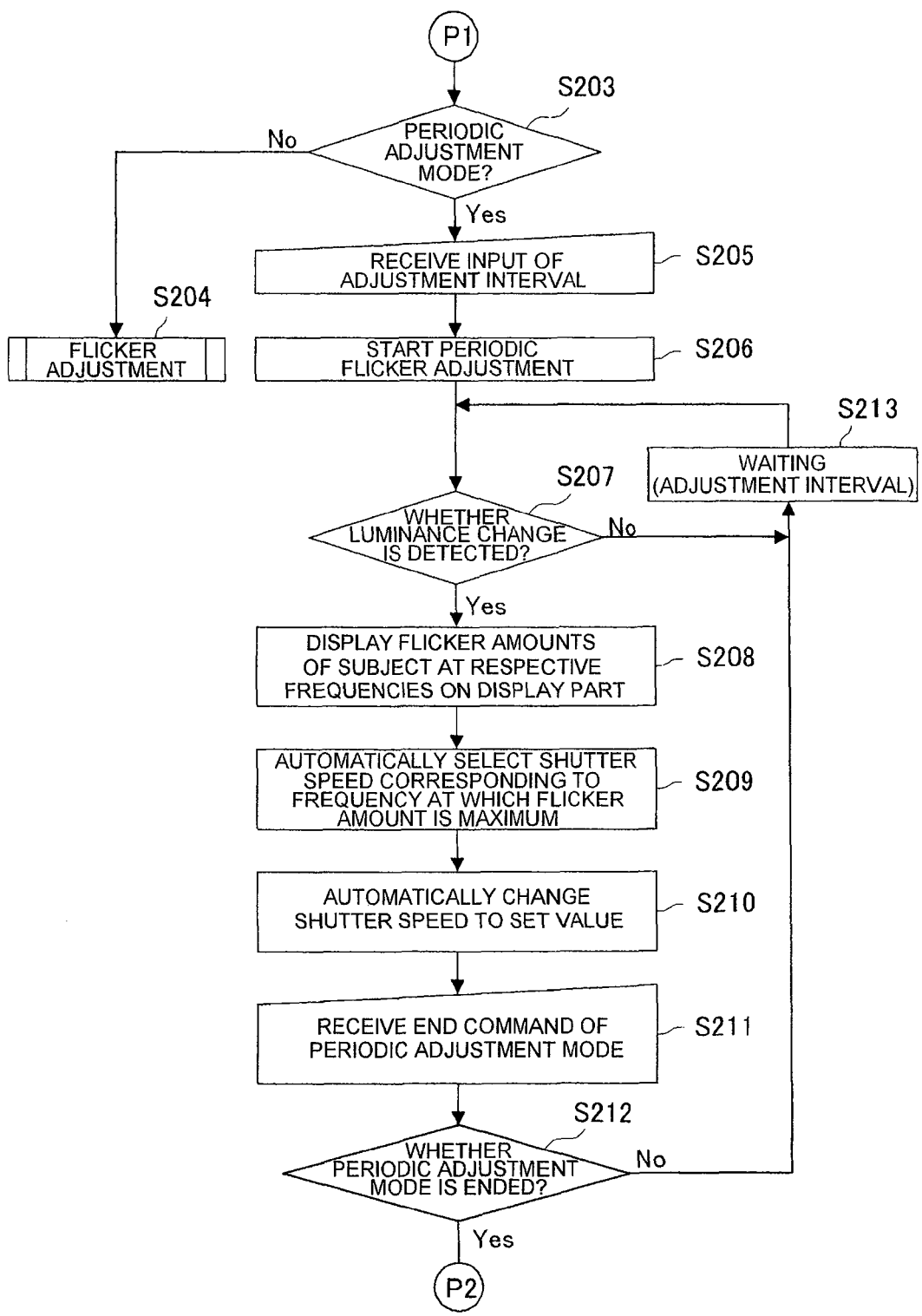
FIG. 5 is a flowchart for explaining a procedure in each mode of flicker adjustment (No. 2: periodic adjustment mode).

Next, a flicker adjustment method in the imaging apparatus including the components as stated above will be described with reference to FIG. 2 to FIG. 5. Here, FIG. 2 is a flowchart for explaining the procedure of flicker adjustment in the imaging apparatus of the first embodiment. FIGS. 3A and 3B are explanatory views for exemplifying the display screens at the time of the flicker adjustment. FIG. 4 and FIG. 5 are flowcharts for explaining procedures in respective modes of the flicker adjustment.

In FIG. 2, first, the flicker adjustment is started (step S101). The control part 31 starts the flicker adjustment based on, for example, the user's depression of the operation button or the operation on the touch panel. Incidentally, at this time, the shutter speed of the imaging part 10 is a previously set initial value.

Next, the control part 31 determines whether the luminance change of a subject is detected by the luminance change detection part 20 (step S102). Here, when a determination is made that the luminance change of the subject is not detected (S102: No), a fact that a flicker is not detected is displayed on the display part/operation part 19 (step S103), and the process proceeds to step S112.

Besides, at step S102, when a determination is made that the luminance change of the subject is detected (S102: Yes), the control part 31 causes the display part/operation part 19 to display flicker amounts based on signal intensities at respective frequencies with respect to the subject luminance change information obtained from the luminance change detection part 20 (step S104).

On the display screens 100 and 100a exemplified in FIGS. 3A and 3B, with respect to a frequency band in a range approximately from 20 Hz to 120 Hz, the flicker amount (flicker barometer) at every 10 Hz is displayed in bar graph form in the flicker amount display area 103. Here, the sum of flicker amounts at respective frequencies is made 100, and the normalized numerical value is used as the flicker amount (flicker barometer). Incidentally, the product of the maximum amplitude of the detected luminance change and the frequency may be used as the flicker amount (flicker barometer), or the obtained signal intensity itself may be used as the flicker amount (flicker barometer).

With respect to the subject luminance change information, when a frequency at which the flicker amount based on the signal intensities at the respective frequencies becomes maximum is made $F_1$ Hz, the control part 31 makes this frequency the flicker frequency, and automatically selects the shutter speed of $1/F_1$ second to reduce the flicker (step S105).

The control part 31 temporarily changes the shutter speed to $1/F_1$ second. The signal processing part 17 calculates a flicker amount based on an image signal obtained when a picture is taken at the shutter speed after the change, and the flicker amount is displayed on the display part/operation part 19 (step S106).

For example, the display screen at the time of automatic setting exemplified in FIG. 3A indicates that in the shutter speed display area 104, an operation bar 110 is located at a position of a shutter speed of 1/60 second corresponding to a frequency of 60 Hz at which the flicker amount becomes maximum, and the shutter speed is changed to 1/60 second. Besides, with respect to the frequency of 60 Hz at which the flicker amount before the shutter speed change becomes maximum, a fact that the flicker amount is 80 is displayed in the display area 101. Further, a fact that the flicker amount after the shutter speed change is 20 is displayed in the display area 102.

Next, the control part 31 determines whether the automatically selected shutter speed of $1/F_1$ second is set as a final shutter speed (step S107). The determination of the final setting is made by, for example, the user's depression of a decision button. When the determination of the final setting is made by the instruction from the user (S107: Yes), the shutter speed is changed to $1/F_1$ second (step S111). Incidentally, also with respect to shutter speeds of $1/F_2$ second to $1/F_k$ second described below, a process at the time of determination of Yes at step S107 is the same as that of the shutter speed of $1/F_1$ second.

On the other hand, at step S107, when there is no instruction from the user (for example, for a specified time) (S107: No (till K times)), a determination is made that the final setting is not performed. When the number of times when the determination of step S107 is performed is K or less from the start of the flicker adjustment, the process returns to step S105.

At this time, at step S105, with respect to the subject luminance change information, when a frequency at which the flicker amount based on the signal intensities at the respective frequencies is second largest is $F_2$ Hz, this is made the flicker frequency, and the shutter speed of $1/F_2$ second to reduce the flicker is automatically selected. Further, at step S106, the shutter speed is temporarily changed to $1/F_2$ second. The signal processing part 17 calculates a flicker amount based on an image signal obtained when a picture is taken at the shutter speed after the change, and the flicker amount is displayed on the display part/operation part 19.

That is, unless the determination of the final setting is made by the user instruction, the temporal change of the shutter speed is performed K times from $1/F_1$ second to $1/F_k$ second. The coefficient K is desirably set to such a degree that the user does not feel annoying, and is, for example, one to three.

On the other hand, when the user instruction of the final setting is not performed even if the shutter speed is temporarily changed K times, that is, when the determination of step S107 is performed K+1 times from the start of the flicker adjustment and there is no instruction from the user (for example, for a specified time) (S107: No (K+1) th), the process proceeds to step S108.

At this time, at step S108, the control part 31 receives the user's selection instruction (shutter speed of 1/N second) from the candidates of the settable shutter speed, and this is set as the shutter speed.

The control part 31 temporarily changes the shutter speed to 1/N second. The signal processing part 17 calculates a flicker amount based on an image signal obtained when a picture is taken at the shutter speed after the change, and the flicker amount is displayed on the display part/operation part 19 (step S109).

For example, the display screen at the time of manual setting exemplified in FIG. 3B indicates that an operation bar 110a is set at a position of a shutter speed of 1/100 second corresponding to a frequency of 100 Hz in the shutter speed display area 104, and the shutter speed is changed to 1/100 second. Besides, with respect to a frequency of 60 Hz at which the flicker amount before the shutter speed change is maximum, a fact that the flicker amount is 80 is displayed in the display area 101. Further, a fact that the flicker amount after the shutter speed change is 40 is displayed in the display area 102a.

Next, the control part 31 determines whether the shutter speed of 1/N second arbitrarily selected by the user is set as the final shutter speed (step S110). The determination of the final setting is performed by, for example, the user's depression of the decision button. When the determination of the final setting is performed by the instruction from the user, the shutter speed is changed to 1/N second (step S111).

After step S103 or step S111 is processed, or when the determination of the final setting is not made at step S110, a determination is made as to whether the flicker adjustment is ended (step S112). This determination is made by, for example, the user's depression of a specific button. When the determination of ending is made by the instruction from the user (S112: Yes), the flicker adjustment is ended (step S113). Besides, when the instruction from the user is not made for a specified time and the determination of not ending is made (S112: No), the process returns to step S102 and the foregoing process is repeatedly performed.

Next, procedures in respective modes of the flicker adjustment will be described with reference to FIG. 4 and FIG. 5. FIG. 4 is a flowchart for mainly explaining the procedure in a continuous adjustment mode, and FIG. 5 is a flowchart for explaining the procedure in a periodic adjustment mode.

According to the use environment of the imaging apparatus 1, it is conceivable that the luminance of the subject is continuously changed by plural illumination light sources having flicker. Thus, in this embodiment, not only the temporal flicker adjustment, but also the continuous adjustment mode and the periodic adjustment mode are provided, and the flicker adjustment is performed continuously or periodically, so that the change of the use environment can be dealt with.

In FIG. 4, when the process is started, the control part 31 first receives mode input of flicker adjustment (step S201), and determines whether the setting of the adjustment mode by the user is the continuous adjustment mode (step S202). Here, when a determination is made that the setting is not the continuous adjustment mode (S202: No), the process proceeds to FIG. 5 through a connector P1.

In FIG. 5, first, the control part 31 determines whether the setting of the adjustment mode by the user is the periodic adjustment mode (step S203). When a determination is made that the setting of the adjustment mode by the user is not the periodic adjustment mode (S203: No), the procedure of the flicker adjustment of FIG. 2 is performed (step S204). On the other hand, when a determination is made that the setting of the adjustment mode by the user is the periodic adjustment mode (S203: Yes), the control part receives the user input of an adjustment interval (T) (step S205), and starts the periodic flicker adjustment (step S206).

In the periodic adjustment mode, similarly to the flicker adjustment procedure of FIG. 2, the control part 31 first determines whether the luminance change detection part 20 detects the luminance change of the subject (step S207). Here, when a determination is made that the luminance change of the subject is not detected (S207: No), the control part 31 waits for an adjustment interval (T) (step S213), and the determination of the luminance change detection of the subject (step S207) is again made. On the other hand, when a determination is made that the luminance change of the subject is detected (S207: Yes), the control part 31 causes the display part/operation part 19 to display the flicker amounts based on the signal intensities at the respective frequencies with respect to the subject luminance change information obtained from the luminance change detection part 20 (step S208).

With respect to the subject luminance change information, when a frequency at which the flicker amount based on the signal intensities at the respective frequencies becomes maximum is made F Hz, the control part 31 makes this frequency the flicker frequency, automatically selects the shutter speed of 1/F second to reduce the flicker (step S209), and changes the shutter speed to the automatically selected value (step S210).

Thereafter, the control part 31 prepares for receiving the user's instruction to end the periodic adjustment mode for a specific time (step S211), and determines whether the periodic adjustment mode is ended (step S212). When the end instruction is not received (S212: No), the control part 31 waits for the adjustment interval (T) (step S213), and the determination of the luminance change detection of the subject (step S207) is again made. On the other hand, at step S212, when the end instruction is received (S212: Yes), the process proceeds to step S231 through a connector P2.

Again, the process returns to FIG. 4, and at step S202, when a determination is made that the mode is the continuous adjustment mode (S202: Yes), the continuous flicker adjustment is started (step S221).

When the continuous adjustment mode is started, first, the control part 31 determines whether the luminance change of the subject is detected by the luminance change detection part 20 (step S222). Here, when a determination is made that the luminance change of the subject is not detected (S222: No), the process returns to step S221, and the determination of the luminance change detection of the subject is again made. On the other hand, when a determination is made that the luminance change of the subject is detected (S222: Yes), the control part 31 causes the display part/operation part 19 to display the flicker amounts based on the signal intensities at the respective frequencies with respect to the subject luminance change information obtained from the luminance change detection part 20 (step S223).

With respect to the subject luminance change information, when a frequency at which the flicker amount based on the signal intensities at the respective frequencies becomes maximum is made F Hz, the control part 31 makes this frequency the flicker frequency, automatically selects the shutter speed of 1/F second to reduce the flicker (step S224), and changes the shutter speed to the automatically selected value (step S225).

Thereafter, the control part 31 prepares for receiving the user's instruction to end the continuous adjustment mode for a specific time (step S226), and determines whether the continuous adjustment mode is ended (step S227). When the end instruction is not received (S227: No), the process returns to step S221, and the determination of the luminance change detection of the subject is again made. On the other hand, when the end instruction is received (S227: Yes), the process proceeds to step S231.

Finally, when the end instruction of the periodic adjustment mode is received (S212: Yes) or the end instruction of the continuous adjustment mode is received (S227: Yes), the control part 31 prepares for receiving the user's instruction to end the flicker adjustment for a specific time (step S231). When the end instruction is not received (S231: No), the process returns to step S202, and a determination is made as to whether the setting of the adjustment mode by the user is the continuous adjustment mode. On the other hand, when the end instruction is received (S231: Yes), the flicker adjustment is ended (step S232), and the series of processes are ended.

As described above, the imaging apparatus 1 of this embodiment includes the imaging part 10 that includes the optical system 11 to form an image of a subject and the imaging element 12 to generate an image signal by photoelectrically converting an optical image of the subject formed by the optical system, the image processing part 16 to perform an image processing on the image signal, the display part/operation part (user interface unit) 19 having at least display and setting functions, the luminance change detection part 20 to detect change of luminance of the subject, and the signal processing part 17 to calculate flicker amounts at respective frequencies based on signal intensities with respect to luminance change information acquired by the luminance change detection unit 20, and the control part 31 causes the display part/operation part 19 to display the flicker amounts at the respective frequencies calculated by the signal processing part 17.

More specifically, at the time of the user's arbitrary setting, the control part 31 changes the shutter speed of the imaging part 10 based on the user setting through the display part/operation part 19 after the flicker amounts at the respective frequencies are displayed on the display part/operation part 19. Besides, at the time of the automatic setting, the control part 31 changes the shutter speed of the imaging part 10 to the shutter speed corresponding to the frequency at which the flicker amount becomes maximum based on the flicker amounts at the respective frequencies.

As described above, since the flicker amounts based on the signal intensities at the respective frequencies are calculated with respect to the luminance change information of the subject and are displayed on the display part/operation part 19, by using the displayed flicker amounts, the installation personnel or the user can determine the optimum shutter speed according to the light source. Besides, at the time of the automatic setting, since the shutter speed is changed to the shutter speed corresponding to the frequency at which the flicker amount becomes maximum, the flicker can be prevented.

Besides, at the time of the user's arbitrary setting, the user's intention can be reflected on the shutter speed setting for preventing the flicker, and the imaging apparatus which can take an image desired by the user can be realized. Even when the shutter speed can not be determined uniquely, for example, when the light source frequency is not known as in the LED illumination, or illumination is performed by plural light sources having difference light source frequencies, the user can set the shutter speed which is determined to be optimum by the user, and the user-friendly imaging apparatus can be realized.

Further, in the imaging apparatus 1 of this embodiment, based on the image signal obtained when a picture is taken at the shutter speed after the change, the signal processing part 17 calculates the flicker amounts at the respective frequencies. The control part 31 causes the display part/operation part 19 to display the flicker amounts at the respective frequencies calculated by the signal processing part 17 after the shutter speed change. By this, the flicker suppression effect by the change of the shutter speed can be quantitatively (numerically) confirmed, and the optimum shutter speed can be determined according to the light source based on this confirmation.

Second Embodiment

Next, an imaging apparatus of a second embodiment of the invention will be described. The structure of the imaging apparatus of this embodiment is similar to that of the first embodiment (FIG. 1), and is different only in a gain control system of an analog AGC 14 by a control part 31. Accordingly, the respective components are denoted by the same reference numerals as those of the first embodiment (FIG. 1).

As described in the first embodiment, the analog AGC 14 is an automatic gain control unit, and adjusts the signal level of an analog imaging signal from the CDS 13 to a specified level based on the instruction of the control part 31. By this, even if the amount of incident light is changed, automatic gain adjustment to a constant level can be performed by automatically correcting the intensity of the image signal level, and the brightness of the output image can be made constant.

In the imaging apparatus of this embodiment, similarly to the first embodiment, the control part 31 has a user arbitrary setting mode and an automatic setting mode. Here, four automatic gain adjustment methods corresponding to these setting modes will be described.

First Automatic Gain Adjustment Method

First, at the time of automatic setting, similarly to the first embodiment, the control part 31 changes the shutter speed of the imaging part 10 to a shutter speed corresponding to a frequency at which the flicker amount becomes maximum based on the flicker amounts at the respective frequencies. The signal processing part 17 calculates the flicker amounts at the respective frequencies based on the image signal obtained when a picture is taken at the shutter speed after the change. The control part 31 causes the display part/operation part 19 to display the flicker amounts at the respective frequencies calculated by the signal processing part 17 after the shutter speed change.

Further, the control part 31 changes the gain of the analog AGC 14 to the gain corresponding to the frequency at which the flicker amount becomes maximum based on the flicker amounts at the respective frequencies after the shutter speed change. Specifically, optimum gains for suppressing the flicker are previously obtained by a simulation experiment or the like according to a subject illuminance, a shutter speed, a frequency at which a flicker amount becomes maximum and the flicker amount, and are stored in a table format in a memory of the control part 31. Then, at the timing after the shutter speed change, the gain according to the subject illuminance at that time, the shutter speed, the frequency at which the flicker amount becomes maximum and the flicker amount is obtained by referring to the table.

As described above, according to the first gain adjustment method, with respect to the flicker frequency which can not be cancelled only by the shutter speed change, flicker suppression is performed by the automatic gain adjustment. Accordingly, the flicker suppression effect of the automatic gain adjustment is auxiliarily added to the flicker suppression effect of the shutter speed change of the electronic shutter, and the suppression rate of the flicker can be further increased.

Second Automatic Gain Adjustment Method

At the time of automatic setting, the control part 31 changes the shutter speed of the imaging part 10 to a shutter speed corresponding to a frequency at which the flicker amount becomes maximum based on the flicker amounts at the respective frequencies, and changes the gain of the analog AGC 14 to a gain corresponding to a frequency at which the flicker amount is second largest.

Also in this case, optimum gains for suppressing the flicker are previously obtained by a simulation experiment or the like according to a subject illuminance, a shutter speed, a flicker frequency and the flicker amount, and are stored in a table format in the memory of the control part 31. Then, at the timing of the shutter speed change, the gain according to the subject illuminance at that time, the shutter speed, the frequency at which the flicker amount becomes maximum and the flicker amount is obtained by referring to the table.

As described above, according to the second automatic gain adjustment method, a flicker due to a light source having a different light source frequency, which can not be cancelled only by the shutter speed change, is suppressed by the automatic gain adjustment. Accordingly, the flicker suppression effect of the automatic gain adjustment is auxiliarily added to the flicker suppression effect of the shutter speed change of the electronic shutter, and the suppression rate of the flicker can be further increased.

Third Automatic Gain Adjustment Method

At the time of user arbitrary setting, similarly to the first embodiment, the control part 31 changes the shutter speed of the imaging part 10 based on the user setting through the display part/operation part 19 after the flicker amounts at the respective frequencies are displayed on the display part/operation part 19. The signal processing part 17 calculates the flicker amounts at the respective frequencies based on the image signal obtained when a picture is taken at the shutter speed after the change. The control part 31 causes the display part/operation part 19 to display the flicker amounts at the respective frequencies after the shutter speed change, which are calculated by the signal processing part 17.

Further, the control part 31 changes the gain of the analog AGC 14 based on the user setting through the display part/operation part 19 after the flicker amounts at the respective frequencies are displayed on the display part/operation part 19. The content of the user setting here may be the setting of the frequency similarly to the first automatic gain adjustment method and the second automatic gain adjustment method, and the specific realization method in that case is similar to the foregoing. Besides, the user is made to select a selection item relating to the quality of an image, such as priority to image quality or priority to visibility, and a gain according to the selected item, the subject illuminance, and the shutter speed may be obtained by referring to the previously prepared table.

As described above, according to the third automatic gain adjustment method, with respect to the flicker frequency which can not be cancelled only by the shutter speed change, the flicker suppression is performed by the automatic gain adjustment. Accordingly, the flicker suppression effect of the automatic gain adjustment is auxiliary added to the flicker suppression effect of the shutter speed change of the electronic shutter, and the suppression rate of the flicker can be further increased. Besides, the automatic gain adjustment determined to be optimum by the user can be set, and the user-friendly imaging apparatus can be realized.

Fourth Automatic Gain Adjustment Method

At the time of automatic setting, the control part 31 changes the shutter speed of the imaging part 10 based on the user setting of a first frequency through the display part/operation part 19 after the flicker amounts at the respective frequencies are displayed on the display part/operation part 19, and changes the gain of the analog AGC 14 based on the user setting of a second frequency through the display part/operation part 19.

In this case, optimum gains for suppressing the flicker are previously obtained by a simulation experiment or the like according to a subject illuminance, a shutter speed, a second frequency and a flicker amount at the second frequency, and are stored in a table format in the memory of the control part 31. Then, at the timing of shutter speed change, the gain according to the subject illuminance at that time, the shutter speed, the second frequency and the flicker amount at the second frequency is obtained by referring to the table.

As described above, according to the fourth automatic gain adjustment method, a flicker due to a light source having a different light source frequency, which can not be cancelled only by the shutter speed change, is suppressed by the automatic gain adjustment. Accordingly, the flicker suppression effect of the automatic gain adjustment is auxiliary added to the flicker suppression effect of the shutter speed change of the electronic shutter, and the suppression rate of the flicker can be further increased. Besides, the automatic gain adjustment determined to be optimum by the user can be set, and the user-friendly imaging apparatus can be realized.

Further, according to the second embodiment, since the flicker cancel process may be continued irrespective of the presence/absence of the flicker, an effect that the appearance or disappearance of flicker does not occur can be obtained. Besides, there is also a merit that the shutter speed may not be fixed. However, there are demerits such as an increase of circuit scale, an influence of transient response and a fluctuation in black level.

Third Embodiment

Next, an imaging apparatus of a third embodiment of the invention will be described with reference to FIG. 6. Here, FIG. 6 is a structural view of the imaging apparatus of the third embodiment. In the drawing, the imaging apparatus 2 of this embodiment includes an imaging part 10 including an optical system 11, an imaging element 12 and an optical control part 32, a CDS 13, an ADC 15*a*, an image processing part 16*a*, a display part/operation part (user interface unit) 19, a luminance change detection part 20 and a control part 31*a*. Here, the same components as those of the first embodiment are denoted by the same reference numerals and a description thereof is omitted, and like components are denoted by adding "a" to the same reference numerals.

The image processing part 16a includes a signal processing part (signal processing unit) 17a and a memory 18a, and performs various signal processes on an image signal which is subjected to an analog signal processing through AFE (the CDS 13 and the ADC 15a) and is converted into a digital signal. Although the signal processing part 17a is similar to that of the first embodiment, a difference is that a digital AGC 14a is included therein. That is, the imaging apparatus 2 of this embodiment is such that the function of the analog AGC 14 of the first embodiment is replaced by a program performed on a processor (DSP etc.) of the signal processing part 17a.

Besides, in the imaging apparatus 2 of this embodiment, similarly to the first embodiment and the second embodiment, the control part 31 has the arbitrary user setting mode and the automatic setting mode. Besides, similarly to the second embodiment, the flicker which can not be suppressed only by the change of the shutter speed according to the first embodiment is suppressed by the automatic gain adjustment of the digital AGC 14a.

In the second embodiment, the optimum gain according to the shutter speed, the flicker frequency and the flicker amount is acquired by referring to the previously prepared table, and the gain adjustment based on the static value is performed. On the other hand, in this embodiment, luminances of image signals for respective field periods are integrated, a difference between the luminance integrated value and a specified reference value is calculated, and a gain in the same field period of a next luminance fluctuation period is adjusted according to the difference. The luminance fluctuation period here is defined as a period which is the least common multiple of the illumination blinking period and one field period (output period of the image signal; vertical synchronous period).

For example, when the illumination blinking period is $\frac{1}{100}$ second, and the field period is $\frac{1}{60}$ second, the luminance fluctuation period is $\frac{1}{20}$ second, and one luminance fluctuation period includes three field periods of the first, second and third field periods. At this time, in each of the first, second and third filed periods, luminances of image signals are integrated, a difference $\Delta S$ between the luminance integrated value and the specified reference value is calculated, and an adjustment amount $\Delta G$ of the digital AGC 14a corresponding to the difference is obtained. That is, the difference $\Delta S$ is obtained by "$\Delta S$=luminance integrated value−reference value", and the adjustment amount $\Delta G$ is obtained by "$\Delta G=-f(\Delta S)$". Specifically, the adjustment amount $\Delta G$ can be obtained by using, for example, a relational expression with respect to the difference $\Delta S$, a table or the like.

The adjustment amounts $\Delta G$ of the digital AGC 14a in the first, second and third filed periods obtained in this way respectively become adjustment amounts $\Delta G$ in the first, second and third filed periods of the next luminance fluctuation period. Incidentally, when the difference $\Delta S$ is negative, the gain of the digital AGC 14a is adjusted to become larger. When the difference $\Delta S$ is positive, the gain of the digital AGC 14a is adjusted to become smaller.

Incidentally, if the luminance integrated value does not reach the reference value by one adjustment, the adjustment is performed plural times. In this case, when all the differences $\Delta S$ in the respective field periods become an allowable value or less, the gain of the digital AGC 14a is not changed, and the adjustment is not performed.

As described above, in the automatic gain adjustment method of this embodiment, with respect to the flicker which can not be cancelled only by the shutter speed change, the optimum gain is flexibly calculated based on the information in the same field period of the previous luminance fluctuation period, and the flicker suppression is performed. Accordingly, the flicker suppression effect of the automatic gain adjustment is auxiliary added to the flicker suppression effect of the shutter speed change of the electronic shutter, and the suppression rate of the flicker can be further increased.

Although the automatic gain adjustment method described above is applied to a video camera for taking a moving image or the like, the basic idea can be applied to a digital camera for taking a static image or the like.

That is, similarly to the first embodiment, the control part 31 changes the shutter speed of the imaging part 10 to the shutter speed corresponding to the frequency at which the flicker amount becomes maximum based on the flicker amounts at the respective frequencies. The luminances are integrated with respect to image signals obtained when a picture is taken at the shutter speed after the change, the difference $\Delta S$ between the luminance integrated value and the specified reference value is calculated, and the adjustment amount $\Delta G$ of the digital AGC 14a corresponding to the difference is obtained. Also in this case, if the luminance integrated value does not reach the reference value by one adjustment, the adjustment is performed plural times. Further, the signal processing part 17 calculates the flicker amounts at the respective frequencies, and the control part 31 causes the display part/operation part 19 to display the flicker amounts at the respective frequencies calculated by the signal processing part 17 after the shutter speed change and the gain adjustment.

Incidentally, the automatic gain adjustment method of this embodiment can be applied to the structure using the analog AGC 14 of the second embodiment. On the contrary, the automatic gain adjustment method of the second embodiment can be applied to the structure using the digital AGC 14a of this embodiment.

Besides, also in this embodiment, similarly to the second embodiment, the flicker cancel process may be continued irrespective of the presence/absence of the flicker. Thus, an effect that the appearance or disappearance of flicker does not occur can be obtained. Further, there is an effect that the hardware demerit in the second embodiment is removed.

Modified Examples

Hitherto, although the embodiments of the invention are described in detail with reference to the drawings, the invention is not limited to these embodiments and their modified examples, but includes design changes within the scope not departing from the spirit of the invention.

For example, in the first, the second and the third embodiments, although the luminance change detection part 20 is exemplified as an independent component such as an illuminance sensor, any unit may be used as long as the luminance change information can be obtained. For example, in the image processing part 16 (signal processing part 17), luminance change information is generated based on a part of the image signal taken by the imaging part 10, and with respect to the luminance change information, the signal processing part 17 may calculate flicker amounts based on signal intensities at respective frequencies. Further, the control parts 31, 31a may perform the generation of the luminance change information based on the image signal and the calculation of the flicker amounts based on the signal intensities at the respective frequencies.

Besides, in the first, the second and the third embodiments, although the functions of the signal processing parts 17, 17a of the image processing parts 16, 16*a* of the invention, and the functions of the control parts 31, 31*a* are realized by programs executed on the processor such as DSP or MPU, part or all of the functions may be realized by hardware such as an integrated circuit.

Besides, the memories 18, 18*a* of the image processing parts 16, 16*a*, and the memories of the control parts 31, 31*a* may be realized by a recording device such as a hard disk or an SSD (Solid State Drive) or a recording medium such as an IC card, an SD card or a DVD. Further, the information of the program to realize the respective functions, the table, various data and the like may be installed into the recording device or the recording medium through a portable recording medium or a network.

Besides, in the first, the second and the third embodiments, although the components required to realize the invention are integrated and the imaging apparatus is constructed, various structures in which a partial structure is separated from the imaging apparatus are conceivable. For example, the luminance change detection part 20 is separated, and the acquired luminance change information may be captured onto the system buses 30, 30*a* through an interface. Besides, the setting function of the shutter speed and the automatic gain adjustment function of the control parts 31, 31*a* may be transferred to another information processing device (server etc.) connected to the imaging apparatus through a network (intranet, internet, LAN, WAN, etc.). In this case, the user interface unit (display part/operation part 19) is included in another information processing apparatus.

What is claimed is:

1. An imaging apparatus comprising:
   an imaging part that includes an optical system to form an image of a subject and an imaging element to generate an image signal by photoelectrically converting an optical image of the subject formed by the optical system;
   an image processing part to perform an image processing on the image signal;
   a user interface unit having at least display and setting functions;
   a luminance change detection unit configured to detect change of luminance of the subject;
   a signal processing unit configured to calculate flicker amounts at respective frequencies based on signal intensities with respect to luminance change information acquired by the luminance change detection unit; and
   a control unit configured to cause the user interface unit to display the flicker amounts at the respective frequencies calculated by the signal processing unit.

2. The imaging apparatus according to claim 1, wherein the control unit changes a shutter speed of the imaging part based on user setting through the user interface unit after the flicker amounts at the respective frequencies are displayed on the user interface unit.

3. The imaging apparatus according to claim 1, wherein the control unit changes a shutter speed of the imaging part to a shutter speed corresponding to a frequency at which the flicker amount becomes maximum based on the flicker amounts at the respective frequencies.

4. The imaging apparatus according to claim 2, wherein
   the signal processing unit calculates flicker amounts at respective frequencies based on an image signal obtained when a picture is taken at the shutter speed after change, and
   the control unit causes the user interface unit to display the flicker amounts at the respective frequencies calculated by the signal processing unit after the shutter speed change.

5. The imaging apparatus according to claim 1, further comprising an automatic gain adjustment unit configured to automatically adjust a gain of the image signal, wherein
   the control unit changes a shutter speed of the imaging part based on user setting of a first frequency through the interface unit after the flicker amounts at the respective frequencies are displayed on the user interface unit, and changes a gain of the automatic gain adjustment unit based on user setting of a second frequency through the user interface unit.

6. The imaging apparatus according to claim 1, further comprising an automatic gain adjustment unit configured to automatically adjust a gain of the image signal, wherein
   the control unit changes a shutter speed of the imaging part to a shutter speed corresponding to a frequency at which the flicker amount becomes maximum based on the flicker amounts at the respective frequencies, and changes a gain of the automatic gain adjustment unit to a gain corresponding to a frequency at which the flicker amount is second largest.

7. The imaging apparatus according to claim 2, further comprising an automatic gain adjustment unit configured to automatically adjust a gain of the image signal, wherein
   the control unit changes a gain of the automatic gain adjustment unit based on user setting through the user interface unit after flicker amounts at respective frequencies are displayed on the user interface unit after the shutter speed change.

8. The imaging apparatus according to claim 2, further comprising an automatic gain adjustment unit configured to automatically adjust a gain of the image signal, wherein
   the signal processing unit calculates flicker amounts at respective frequencies based on an image signal obtained when a picture is taken at the shutter speed after change, and the control unit changes a gain of the automatic gain adjustment unit to a gain corresponding to a frequency at which the flicker amount becomes maximum based on the flicker amounts at the respective frequencies.

9. The imaging apparatus according to claim 5, wherein
   the signal processing unit calculates flicker amounts at respective frequencies based on an image signal obtained when a picture is taken at the shutter speed after change and at the gain of the automatic gain adjustment unit after adjustment, and
   the control unit causes the user interface unit to display the flicker amounts at the respective frequencies calculated by the signal processing unit after the shutter speed change and the gain adjustment.

10. The imaging apparatus according to claim 3, wherein
    the signal processing unit calculates flicker amounts at respective frequencies based on an image signal obtained when a picture is taken at the shutter speed after change, and
    the control unit causes the user interface unit to display the flicker amounts at the respective frequencies calculated by the signal processing unit after the shutter speed change.

11. The imaging apparatus according to claim 3, further comprising an automatic gain adjustment unit configured to automatically adjust a gain of the image signal, wherein
    the control unit changes a gain of the automatic gain adjustment unit based on user setting through the user interface unit after flicker amounts at respective frequencies are displayed on the user interface unit after the shutter speed change.

12. The imaging apparatus according to claim 3, further comprising an automatic gain adjustment unit configured to automatically adjust a gain of the image signal, wherein
- the signal processing unit calculates flicker amounts at respective frequencies based on an image signal obtained when a picture is taken at the shutter speed after change, and the control unit changes a gain of the automatic gain adjustment unit to a gain corresponding to a frequency at which the flicker amount becomes maximum based on the flicker amounts at the respective frequencies.

13. The imaging apparatus according to claim 6, wherein
- the signal processing unit calculates flicker amounts at respective frequencies based on an image signal obtained when a picture is taken at the shutter speed after change and at the gain of the automatic gain adjustment unit after adjustment, and
- the control unit causes the user interface unit to display the flicker amounts at the respective frequencies calculated by the signal processing unit after the shutter speed change and the gain adjustment.

\* \* \* \* \*